United States Patent

Welch et al.

[11] Patent Number: 5,670,743
[45] Date of Patent: Sep. 23, 1997

[54] STRIP ELECTRICAL SYSTEM

[75] Inventors: Richard Welch, Fort Wayne, Ind.; Rick E. Zemen, Jr., Austin, Tex.

[73] Assignee: Group Dekko International, LaOtto, Ind.

[21] Appl. No.: 333,368

[22] Filed: Nov. 2, 1994

Related U.S. Application Data

[63] Continuation-in-part of Ser. No. 975,603, Nov. 12, 1992, Pat. No. 5,396,027.

[51] Int. Cl.$^6$ ............................................. H02G 3/10
[52] U.S. Cl. ........................... 174/49; 174/68.2; 439/215; 52/220.7
[58] Field of Search ........................... 174/48, 49, 53, 174/68.2; 439/215, 211, 207, 210; 52/220.7, 239, 36.1

[56] References Cited

U.S. PATENT DOCUMENTS

| | | |
|---|---|---|
| 895,362 | 8/1908 | Goldschmidt . |
| 1,718,252 | 6/1929 | Putnam . |
| 1,718,253 | 6/1929 | Putnam . |
| 2,150,963 | 3/1939 | De Mask . |
| 2,250,513 | 7/1941 | Von Gehr . |
| 2,356,006 | 8/1944 | Samer ......................... 439/207 X |
| 2,444,648 | 7/1948 | Jackson et al. . |
| 2,979,686 | 4/1961 | Longmire . |
| 3,157,732 | 11/1964 | Richards . |
| 3,439,309 | 4/1969 | Giger, Jr. et al. . |
| 3,464,052 | 8/1969 | Hukin . |
| 3,488,621 | 1/1970 | Stevens . |
| 3,922,478 | 11/1975 | Perkey . |
| 4,056,297 | 11/1977 | Gartung . |
| 4,060,294 | 11/1977 | Haworth et al. . |
| 4,199,206 | 4/1980 | Haworth et al. . |
| 4,203,639 | 5/1980 | VandenHoek et al. . |
| 4,231,630 | 11/1980 | Propst et al. . |
| 4,336,418 | 6/1982 | Hoag . |
| 4,795,355 | 1/1989 | Dorn et al. . |
| 4,800,695 | 1/1989 | Menchetti . |
| 4,874,322 | 10/1989 | Dola et al. . |
| 4,875,871 | 10/1989 | Booty, Sr. et al. . |
| 4,952,163 | 8/1990 | Dola et al. . |
| 4,973,796 | 11/1990 | Dougherty et al. . |
| 5,092,787 | 3/1992 | Wise et al. . |
| 5,141,447 | 8/1992 | Poirier . |
| 5,396,027 | 3/1995 | Zemen, Jr. ......................... 174/48 |

FOREIGN PATENT DOCUMENTS 1344398   10/1963   France .

OTHER PUBLICATIONS

"Smart House Revealed," Popular Science, Nov. 1990, pp. 51-52.

*Primary Examiner*—Kristine L. Kincaid
*Assistant Examiner*—Dean A. Reichard
*Attorney, Agent, or Firm*—Barnes & Thornburg

[57] ABSTRACT

A wiring assembly for mounting on an exposed surface of a wall or wall panel to supply electrical power to the wall or wall panel. The wiring assembly includes a plurality of conductive bus bars and an insulating support having a base and a plurality of generally parallel dividers extending upwardly from the base to define a plurality of slots therebetween. Each slot is configured to receive a conductive bus bar therein. The support is coupled to said exposed surface. The assembly also includes at least one cover and at least one outlet coupled to the support. The at least one cover and the at least one outlet are situated over the plurality of dividers to shield the plurality of conductive bus bars situated in the plurality of slots. The at least one cover and the at least one outlet are adjacent one another on the support.

32 Claims, 9 Drawing Sheets

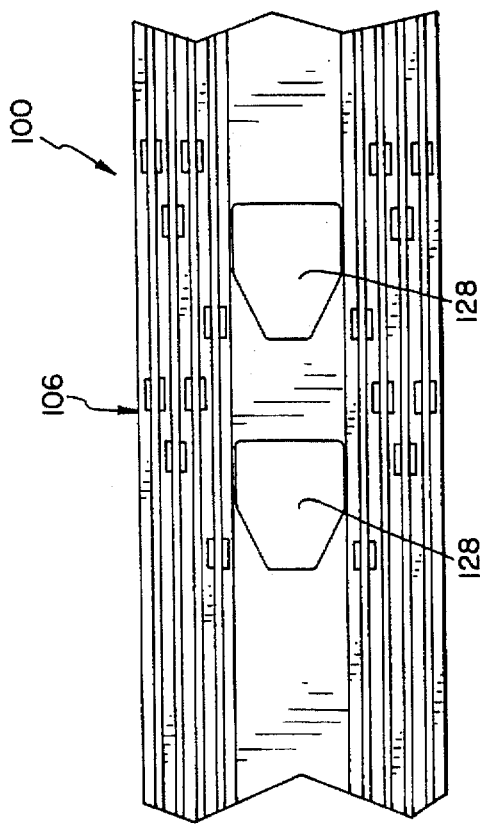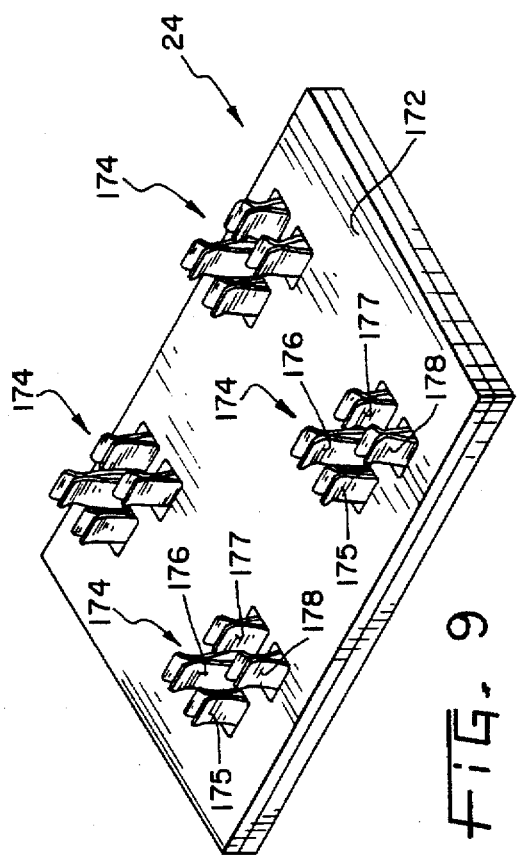

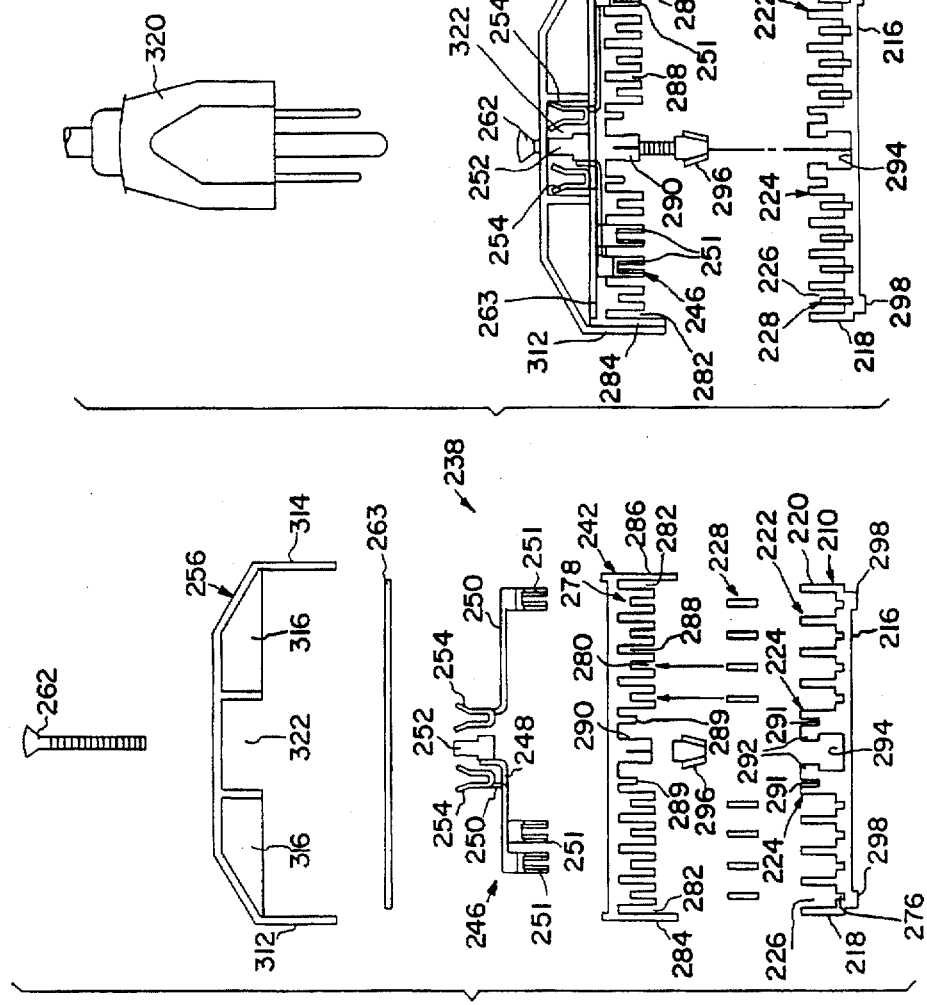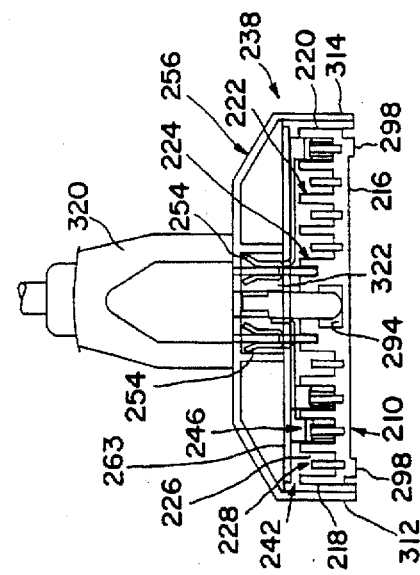
FIG.11C
FIG.11B
FIG.11A

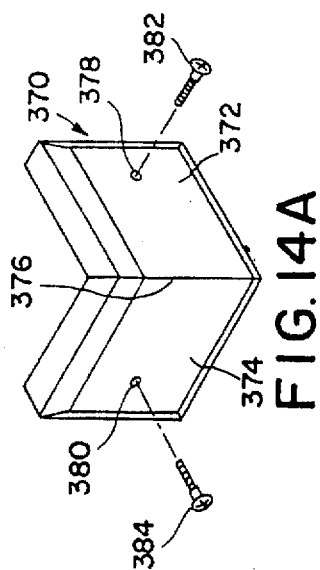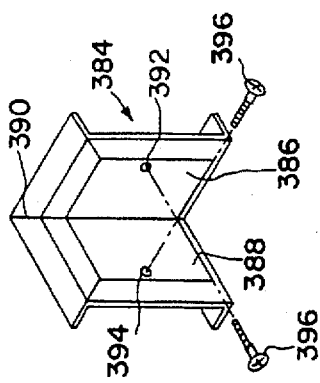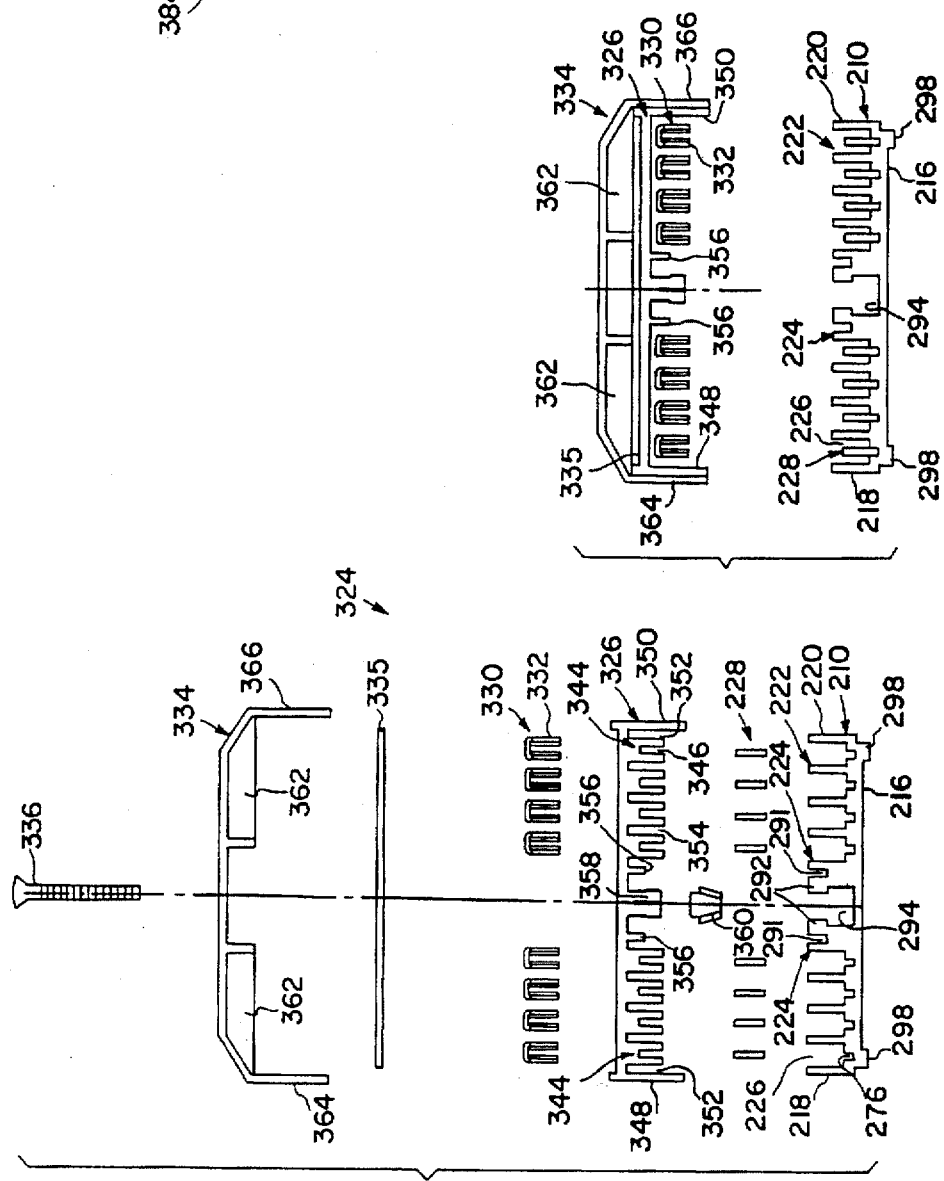

STRIP ELECTRICAL SYSTEM

BACKGROUND AND SUMMARY OF THE INVENTION

This is a continuation-in-part application of U.S. application Ser. No. 07/975,603, filed Nov. 12, 1992, now U.S. Pat. No. 5,396,027 for a "Strip Electrical System."

The present invention relates to a surface mounted continuous wiring system. More particularly, the present invention relates to a modular wiring system for mounting on the surface of a wall or wall panel to supply electrical power to the wall or wall panel.

Modern offices often use free-standing partitions or wall panels to form individual office cubicles in an open office environment. These cubicles provide a proper working environment while maintaining versatility and mobility for unrestricted office organization and expansion. It is essential that each of the cubicles formed by the wall panels is provided with electrical power. Therefore, various wiring systems which permit adjacent panels to be electrically coupled together have been developed. Wall panels often need to be assembled, disassembled, or reconfigured to provide larger or smaller work stations. Therefore, it is essential that the wiring system be flexible and easy to reconfigure. It is known to provide various types of wiring harness assemblies located inside wall panels to supply power to the wall panels.

The present invention is designed to be mounted on an external, exposed surface of the wall panels or on an exposed surface of any existing wall in the building to provide electrical power to that area of the building. The present invention is designed to minimize the amount of copper required and to provide a continuous wiring system which is easy to install with no complex wiring to install.

Because the continuous wiring system of the present invention is mounted on an external exposed surface of the wall, the continuous wiring system of the present invention can be placed at any height on the wall for easy access. Therefore, the surface mount continuous wiring system of the present invention facilitates supplying electricity to any desired area of a building. Advantageously, the surface mount continuous wiring system of the present invention simplifies installation and is easy to reconfigure if desired.

According to one aspect of the present invention, a wiring assembly is provided for mounting on an exposed surface of a wall or wall panel to supply electrical power to the wall or wall panel. The wiring assembly includes a plurality of conductive bus bars and an insulating support having a base and a plurality of generally parallel dividers extending upwardly from the base to define a plurality of slots therebetween. Each slot is configured to receive a conductive bus bar therein. The assembly also includes means for coupling the support to said exposed surface and a cover coupled to the support. The cover is situated over the plurality of dividers to shield the plurality of conductive bus bars situated in the plurality of slots. The assembly further includes outlet means coupled to the conductive bus bars for providing an outlet for electrical power from the wiring assembly.

According to another aspect of the present invention, the support includes first and second side walls located on opposite sides of the base and an elongated tab formed on each of the first and second side walls. The cover includes a face plate and first and second side members extending away from the face plate. The first and second side members of the cover each include an inwardly extending flange for engaging the tabs on the first and second side walls, respectively, to secure the cover to the support.

According to yet another aspect of the present invention, the cover includes a plurality of inwardly extending insulating strips for entering the plurality of slots formed in the support to hold the plurality of conductive bus bars in a predetermined position within the support. The cover is preferably a one-piece, electrically insulated cover.

The outlet means includes an outlet box located adjacent the cover. The outlet box is formed to include a plurality of apertures. The outlet means also includes a plurality of clip connectors configured to pass through the plurality of apertures formed in the outlet box and to engage selected conductive bus bars. The outlet means further includes means for receiving blade electrodes of a power plug to couple the power plug to the bus bars, thereby supplying electrical power from the conductive bus bars to the power plug.

In one embodiment of the present invention, the wiring assembly comprises eight conductive bus bars arranged in a substantially equal vertical spaced relation. The outlet means includes a receptacle located vertically spaced below the bus bars and the cover.

In another embodiment of the present invention, the wiring assembly comprises eight conductive bus bars located in a vertical spaced relation. Four of said bus bars being substantially equally spaced to form a first set of bus bars. The remaining four of said bus bars are substantially equally spaced to form a second set of bus bars. The first set of bus bars is vertically spaced from said second set of bus bars. In this embodiment, the outlet means is disposed between said first and second sets of bus bars.

According to still another aspect of the present invention, a modular wiring assembly is provided for mounting on an exposed surface of a wall or wall panel to supply electrical power to the wall or wall panel. The wiring assembly includes a plurality of conductive bus bars and a plurality of one piece electrically insulating supports. Each support includes a base and a plurality of generally parallel insulating dividers extending upwardly from the base to define a plurality of elongated slots therebetween. Each slot is configured to receive one of the plurality of conductive bus bars therein. The wiring assembly also includes means for coupling the plurality of supports to said exposed surface to form a continuous wiring strip on the exposed surface and a plurality of covers. One cover is coupled to each of the supports to shield the plurality of conductive bus bars situated in the plurality of slots. The wiring assembly further includes a plurality of electrical outlets and means for coupling said plurality of electrical outlets to selected ones of said bus bars. The wiring assembly still further includes means for electrically coupling conductive bus bars located in adjacent supports together to provide a continuous electrical path through the plurality of supports.

The means for electrically coupling conductive bus bars located in adjacent supports together includes a jumper located between each adjacent support. Each jumper includes a plurality of conductive clips for electrically coupling conductive bus bars located in adjacent supports together.

In yet another embodiment of the present invention, the wiring assembly includes a plurality of conductive bus bars and an insulating support having a base and a plurality of generally parallel first dividers extending from the base to define a plurality of spaces between the first dividers that are configured to receive one of the conductive bus bars. The wiring assembly also includes structure for coupling the support to the exposed surface. In preferred embodiments, the coupling structure includes a stand-off that extends from the base in a direction generally opposite that of the first dividers. An adhesive is applied to this stand-off to mount the assembly to the exposed surface of the wall or wall panel.

The wiring assembly also includes one or more covers that are coupled to the support so that first portions of the conductive bus bars lie between the support and the covers. Each cover is configured to include a plurality of generally parallel dividers that extend into the plurality of spaces in the support and engage the plurality of conductive bus bars to facilitate positioning of the bus bars within the support. The dividers of the cover define a plurality of spaces into which the first dividers of the support extend. The length of each cover is chosen so that predetermined second portions of the bus bars remain exposed.

The support of the wiring assembly is further configured to include a pair of generally parallel adjacent second dividers that extend from the base of the support to define a space. Each second divider is configured to include a ledge that faces toward the ledge of the other second divider so that the size of the space between the second dividers transitions from a first size to a larger second size. Each cover is configured to include a stud that extends into the space of the second dividers and lies adjacent the ledges of the second dividers.

At least one outlet is coupled to selected ones of second exposed portions of the bus bars to form an electrical circuit at a selected one of multiple points along the lengths of the bus bars. The exposed second portions of the bus bars are positioned to lie between each outlet and the support. Each end of each cover is configured to include a plurality of mortises and each end of each outlet is configured to include a plurality of tenons that fit within the mortises of adjacent covers to couple the outlet to the covers.

Each outlet includes a body that is configured to receive a plurality of conductive clips of the outlet that couple to selected ones of the bus bars. The body of the outlet is further configured to include a plurality of generally parallel dividers that extend into the plurality of spaces of the support and engage the plurality of conductive bus bars. The body of the outlet is further configured to include a fastener stud that extends into the space of the second dividers of the support and lies adjacent the ledges of the second dividers. The outlet further includes a cover and a plate positioned to lie between the conductive clips and the cover. The cover is coupled to the body of the outlet and the support via at least one fastener that passes through an aperture in the cover and engages the fastener stud and a nut that is positioned to lie within the space of the second dividers of the support.

A jumper electrically couples conductive bus bars located in adjacent supports together. The jumper includes a body that is configured to receive a plurality of conductive clips of the jumper that couple to the plurality of conductive bus bars in adjacent supports. The body of the jumper is configured to include a plurality of generally parallel dividers that extend into the plurality of spaces in the support and engage the plurality of conductive bus bars. The jumper is further configured to include a fastener stud that extends into the space of the second dividers and lies adjacent the ledges of the second divider. A cover of the jumper is coupled to the body of the jumper and two adjacent supports via a plurality of fasteners that pass through a corresponding number of apertures in the cover. These fasteners engage the fastener studs of adjacent supports and a plurality of nuts. The nuts correspond in number to the number of fasteners and are positioned to lie within the spaces of the second dividers adjacent the ledges of the second dividers.

Each jumper includes a body having opposing ends that are configured to include a plurality of tenons. Ends of covers adjacent the jumpers are each configured to include a plurality of mortises that receive the tenons of the jumper to couple the jumper to the adjacent covers. The jumper is configured to have dimensions so that exposed third portions of the conductive bus bars in adjacent supports lie between the adjacent supports and the jumper.

Embodiments of the jumper of the present invention may be constructed so that wiring assemblies mounted on exposed portions of adjacent walls that are angled with respect to one another may be connected together by the jumper. For example, one jumper of the present invention includes a jumper having first and second body portions each with first ends that are connected adjacent one another so that the first and second body portions are substantially orthogonal. This allows wiring assemblies mounted on exposed portions of adjacent walls that are generally angled 90° from one another to be connected together.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

FIG. 8 is a side elevational view of a surface mount support for the belt level continuous wiring system illustrated in FIG. 7.

FIG. 9 is a perspective view of a jumper connector for electrically coupling two adjacent surface mount supports of the belt level continuous wiring systems.

FIG. 11a is an exploded end view of the outlet, conductive bus bars, and support of the wiring assembly of the present invention.

FIG. 11b is a partially exploded view of the outlet, conductive bus bars, and support of the wiring assembly of the present invention and a standard three-prong electrical plug.

FIG. 11c is an assembled view of the outlet, conductive bus bars, and support of the wiring assembly of the present invention with the standard three-prong electrical plug inserted into the outlet.

FIG. 13a is an exploded end view of the jumper, conductive bus bars, and support of the wiring assembly of the present invention.

FIG. 13b is a partially exploded view of the jumper, conductive bus bars, and support of the wiring assembly of the present invention with portions shown in FIG. 13a removed so that other elements are more clearly visible.

FIG. 14a is a perspective view of a jumper of the present invention for interconnecting wiring assemblies mounted on exterior exposed surfaces of adjacent wall panels that intersect one another at an angle of approximately 90°.

FIG. 14b is a perspective view of a jumper of the present invention for interconnecting wiring assemblies mounted on interior exposed surfaces of adjacent wall panels that intersect one another at an angle of approximately 90°.

DETAILED DESCRIPTION OF THE DRAWINGS

Figure 1:
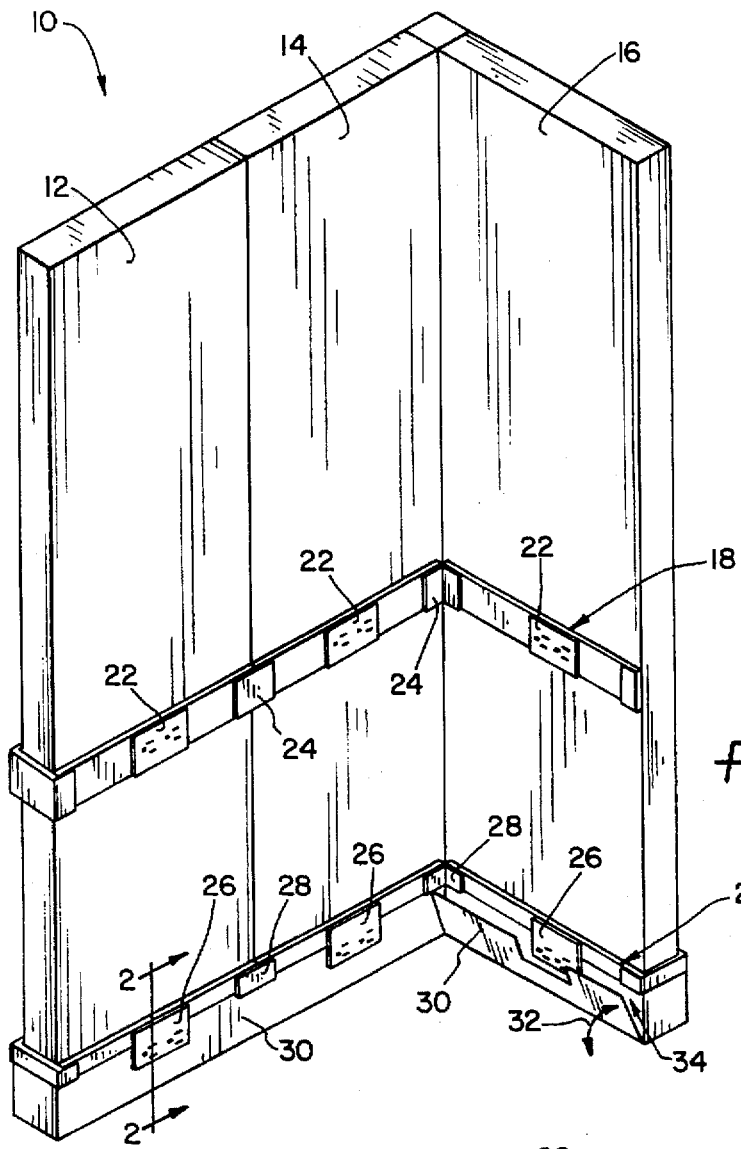
FIG. 1 is a perspective view of a wall panel system including a belt level continuous wiring assembly and a floor level continuous wiring assembly of the present invention surface mounted on the wall panels.

Referring to FIG. 1, a wall panel system 10 is illustrated for dividing a room into a plurality of work stations. Wall panel system 10 includes a plurality of wall panels 12, 14, and 16 which are coupled together. The surface mount continuous wiring system of the present invention includes a belt level continuous wiring assembly 18 and a floor level continuous wiring assembly 20. Belt level continuous wiring assembly 18 includes a plurality of receptacles 22 and a plurality of jumpers 24 for coupling adjacent components of assembly 18 together electrically. Floor level continuous wiring assembly 20 includes a plurality of receptacles 26 and a plurality of jumpers 28 for coupling adjacent components of floor level assembly 20 together electrically. Receptacles 22 are substantially centered on belt level continuous wiring assembly 18. Receptacles 26 extend below the floor level assembly 20.

Figure 2:
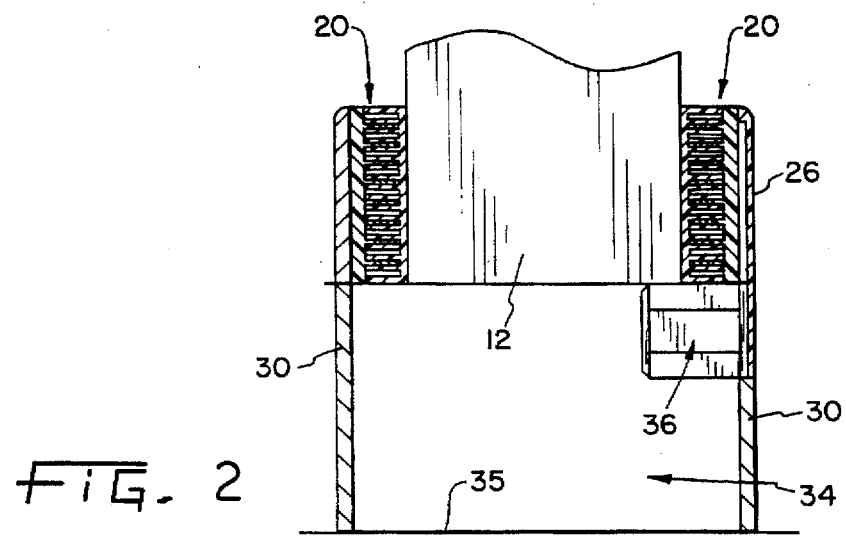
FIG. 2 is a sectional view taken along lines 2—2 of FIG. 1 illustrating the configuration of the floor level continuous wiring assembly and a communications raceway formed beneath the wall panel.

Access panels 30 are movable in the direction of arrow 32 to provide access to a communication raceway 34 below wall panels 12, 14 and 16. FIG. 2 illustrates the communications raceway 34 in detail. Communications raceway 34 is a chamber defined between the bottom of wall panel 12, 14 and 16 opposite access panels 30, and floor 35. Receptacle outlets 26 of floor level continuous wiring assembly 20 extend into communications raceway 34. Access panels 30 can be removed without exposing any of the conductive leads inside the floor level continuous wiring assembly 20. The communications raceway 34 also permits communication lines such as telephone lines and computer cables to be routed beneath wall panels 12, 14, and 16.

Both the belt level wiring assembly 18 and floor level wiring assembly 20 are mounted to an exposed surface of wall panels 12, 14 and 16. It is understood, however, that both belt level wiring assembly 18 and floor level wiring assembly 20 can be mounted on any wall or surface of a building to supply electrical power to the building.

Figure 3:
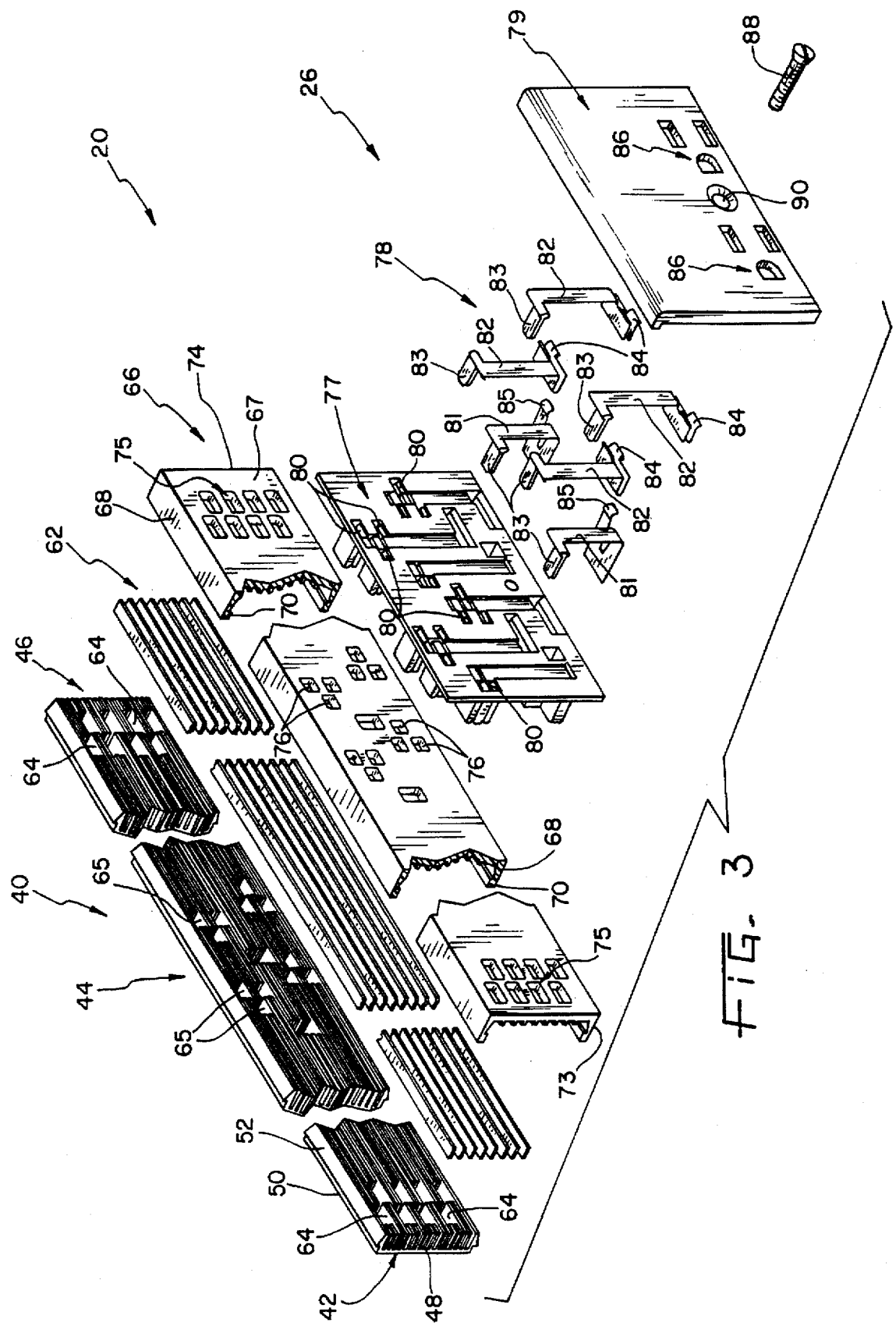
FIG. 3 is an exploded perspective view of the floor level continuous wiring assembly of the present invention including a lower surface mount support, a plurality of conductive bus bars, a strip cover, and a receptacle outlet including a plurality of clips for coupling a plug to the conductive bus bars.
Figure 5:
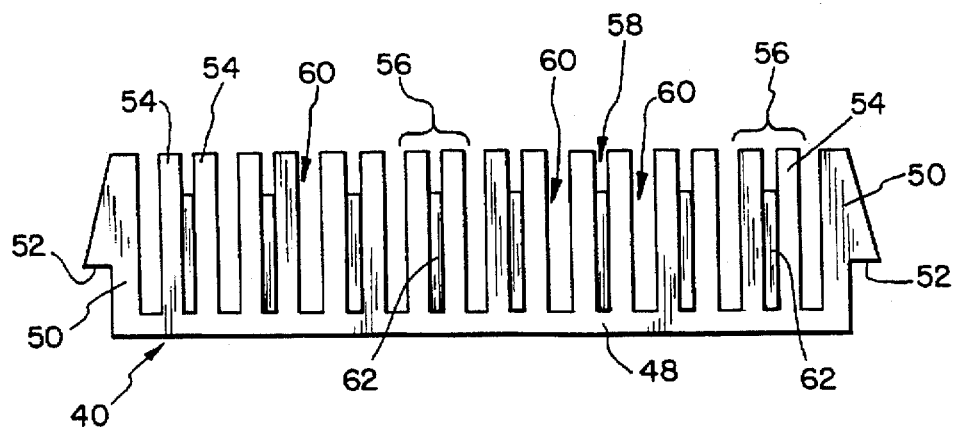
FIG. 5 is an end elevational view of the lower surface mount support illustrated in FIG. 3 after the conductive bus bars have been inserted into the plurality of conductor-receiving slots formed in the lower surface mount support.

Floor level wiring assembly 20 as best illustrated in FIG. 3 includes a plurality of extruded carriers or supports 40. Only one of the supports 40 is illustrated in detail in FIG. 3. A plurality of supports 40 are electrically coupled to provide wiring assembly 20. Surface mount support 40 is preferably an elongated extruded plastic support 40 having a first end 42, a center receptacle-receiving portion 44, and a second end 46. As best illustrated in FIG. 5, support 40 is formed to include a base 48 and upwardly extending side walls 50. Side walls 50 are each formed to include an elongated tab member 52 extending outwardly from side walls 50. Support 40 is also formed to include a plurality of upstanding dividers 54 which extend upwardly away from base 48. Dividers 54 are generally parallel to each other and to side walls 50 of support 40. Dividers 54 are arranged in divider pairs 56 which define a slot 58 therebetween. In addition, slots 60 are formed between adjacent pairs 56 of dividers 54. A conductive bus bar 62 is positioned within each slot 58 between each pair 56 of dividers 54. In the FIG. 3 embodiment, a total of eight conductive bus bars 62 are located in support 40. Bus bars 62 are arranged in a substantially equal vertical spaced relation.

Figure 6:
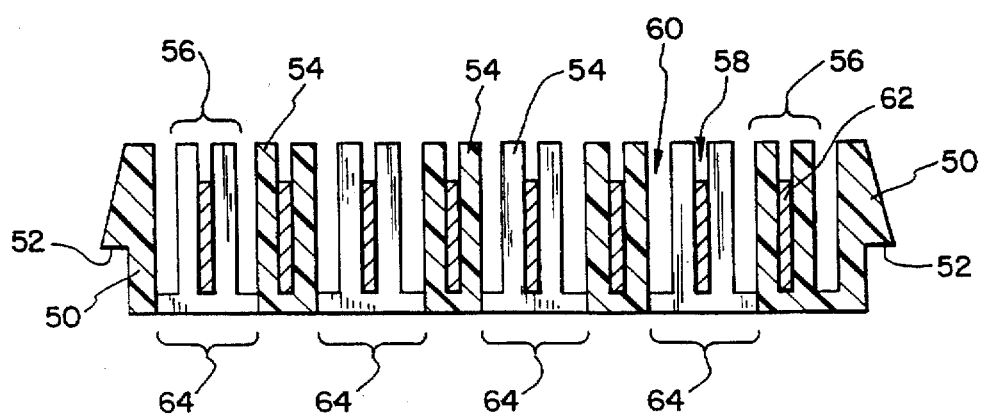
FIG. 6 is a sectional view taken through punched out apertures formed in the lower surface mount support.

As illustrated in FIG. 3, support 40 is formed to include a plurality of apertures 64 adjacent first end 42 and adjacent second end 44. In addition, a plurality of apertures 65 are punched from receptacle-receiving section 44 of support 40. Apertures 64 and 65 are punched completely through base 48 of support 40. The configuration of the punched-out apertures 64 is illustrated in FIGS. 3 and 6. Apertures 64 are staggered in two rows of apertures in order to leave a portion of the insulating dividers 54 of support 40 on opposite sides of each conductive bus bar 62.

Figure 4:
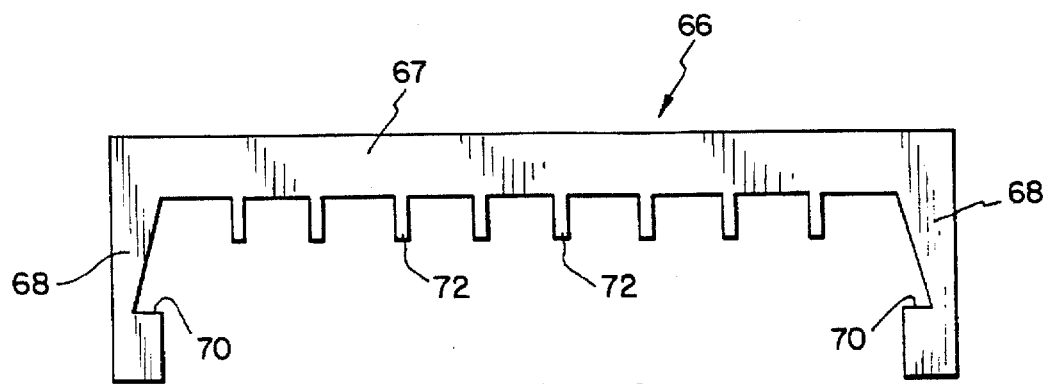
FIG. 4 is an end elevational view of the cover illustrated in FIG. 3.

Floor level wiring assembly 20 includes a plurality of covers 66 for covering the plurality of supports. FIG. 4 illustrates a cover 66 which is configured to be coupled to support 40. Cover 66 is formed from an extruded plastic material and includes a front plate 67 and opposite side members 68. Each side member 68 includes a flange 70 for engaging tabs 52 of support 40 to lock cover 66 to support 40. Cover 66 also includes eight inwardly-extending strips 72. Inwardly-extending strips 72 are configured to enter slots 58 between pairs 56 of dividers 54. Inwardly-extending strips 72 engage conductive bus bars 62 to hold conductive bus bars 62 in the predetermined position illustrated in FIGS. 5 and 6 against base 48 of support 40.

As illustrated in FIG. 3, cover 66 includes a first end 73 and a second end 74. Cover 66 is formed to include a plurality of apertures 75 adjacent both first end 73 and second end 74. Apertures 75 have an identical pattern to apertures 64 formed in support 40. In addition, cover 66 is formed to include a plurality of apertures 76 having the same predetermined pattern as apertures 65 formed in support 40. Cover 66 shields bus bars 62 located within support 40 so that the conductive bus bars 62 are not exposed.

Receptacle 26 of floor level continuous wiring assembly 20 includes an outlet body 77, a plurality of conductive clips 78, and a cover plate 79. Outlet body 77 is formed to include apertures 80 having a pattern corresponding to apertures 76 formed in cover 66 and aperture 65 formed in support 40.

Clips 78 include ground clips 81 and clips 82 which engage blade electrodes or prongs of a common plug inserted into receptacle 26. Clips 81 and 82 include inwardly projecting connectors 83 which pass through apertures 80 formed in outlet body 77 through apertures 76 formed in cover 66, and engage selected bus bars 62 located within apertures 65 of support 40. Cover plate 79 is formed to include two sets of standard apertures 86 for receiving standard three-prong plugs. Fastener 88 extends through an aperture 90 formed in cover plate 79 to secure the floor level continuous wiring assembly 20 to a selected wall panel 12, 14 or 16. Clips 82 also include outwardly opening connectors 84 for engaging the blade electrodes or prongs of the common plug which is inserted into apertures 86 of cover plate 79. Ground clips 81 include a spring contact 85 for engaging the ground prong of the plug.

The jumpers 28 for coupling adjacent supports 40 together electrically include a plurality of conductive clips which engage bus bars 62 within aperture 64. It is understood that jumpers 28 for the floor mount supports 40 are configured similar to jumper 24 illustrated in FIG. 9 and discussed in more detail below. However, the clips 174 of jumpers 28 are positioned closer together to correspond to apertures 64 in first end 42 and second end 46 of support 40.

Figure 7:
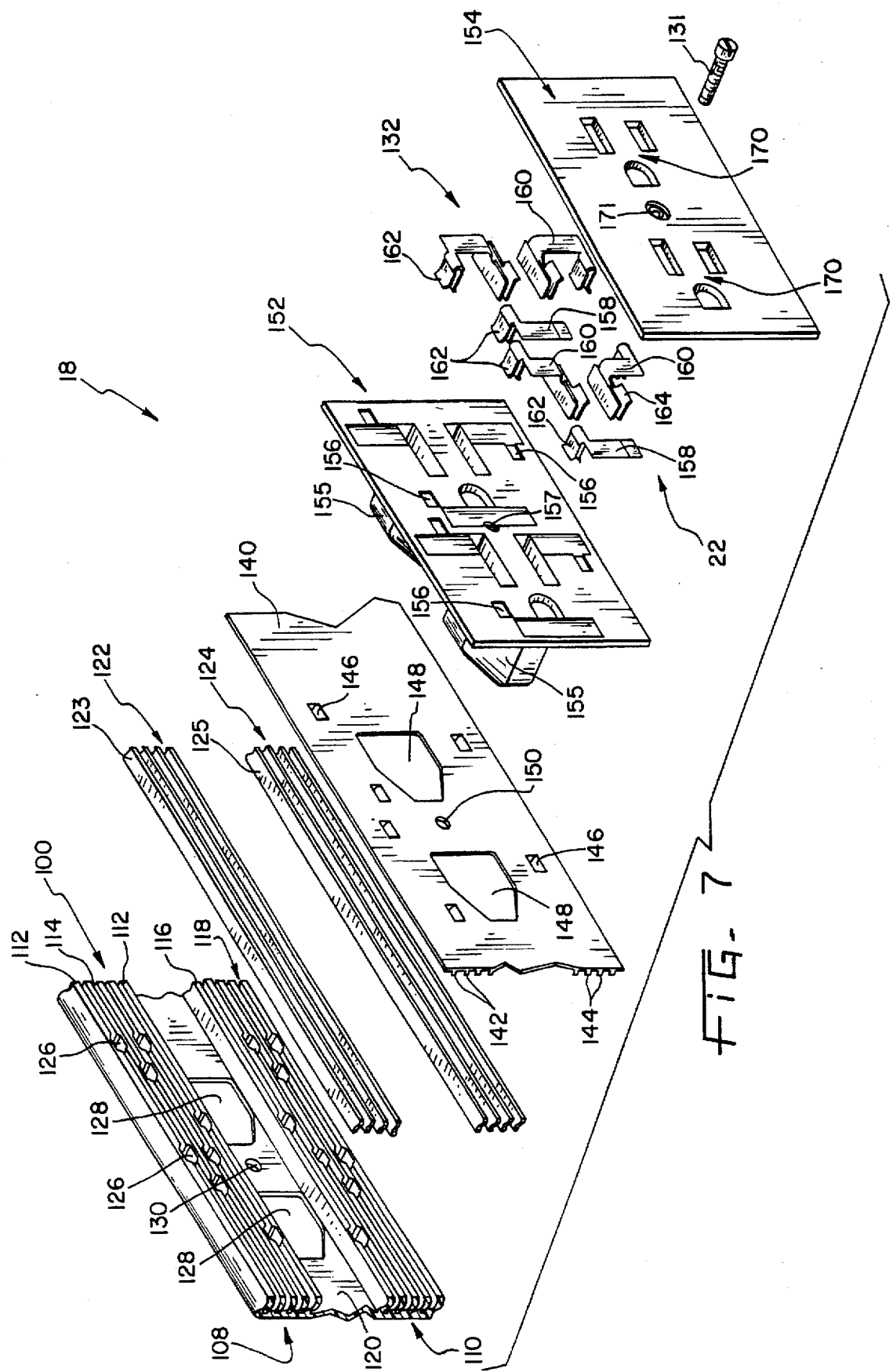
FIG. 7 is an exploded perspective view of the belt level continuous wiring assembly of the present invention including a surface mount support, a plurality of conductive bus bars, a cover, and a receptacle outlet including a plurality of clips for coupling a plug to the conductive bus bars.

The belt level continuous wiring assembly 18 is illustrated in detail in FIG. 7. Wiring assembly 18 includes a plurality of supports 100. Support 100 is illustrated in FIG. 8. Support 100 is made from an extruded plastic material and includes a first end portion 102, a second end portion 104, and a receptacle-receiving portion 106. Support 100 includes a first bus bar receiving portion 108 and a second bus bar receiving portion 110 spaced apart from first bus bar receiving portion 108. First portion 108 includes five upstanding dividers 112 which define four bus bar conductor-receiving slots 114 therebetween. Second portion 110 also includes five upstanding dividers 116 which define four bus bar conductor-receiving slots 118 therebetween. A center section 120 of support 100 is situated between first portion 108 and second portion 110. A first set 122 of four conductive bus bars 123 is situated in slots 114 of first portion 108. A second set 124 of four conductive bus bars 125 is situated in the conductor-receiving slots 118 of second portion 110 of support 100. Support 100 is punched to form a plurality of notches or cavities 126 therein. In addition, outlet apertures 128 are punched into center section 120 of support 100. A center aperture 130 is also punched in center section 120 of support 100 for receiving a fastener 131 therethrough to secure support 100 to a wall panel or wall. Cavities 126 permit a plurality of spring clips 132 to engage conductive bus bars 123 and 125.

Belt level continuous wiring assembly 18 includes an extruded plastic cover 140. Cover 140 includes four inwardly-extending strips 142 which enter slots 114 of first portion 108 of support 100 to hold the conductive bus bars 123 in a predetermined position in slots 114. In addition, cover 140 includes a second set of inwardly-extending strips 144 which enter slots 118 formed in second portion 110 of support 100. Strips 144 enter slots 118 and engage conductive bus bars 125 to hold bus bars 125 in a predetermined position within slots 118. Cover 140 is punched to include a plurality of clip-receiving apertures 146, two outlet receiving apertures 148, and a fastener-receiving aperture 150. Cover 140 can be coupled to support 100 by ultrasonic welding or by other suitable means so that cover 140 is permanently attached to support 100.

Receptacle 22 includes an outlet body 152, a plurality of conductive clips 132, and a cover plate 154. Outlet body 152 includes receptacle outlets 155 disposed between first set 122 and second set 124 of bus bars 123 and 125. Outlet body 152 is formed to include apertures 156 having the same pattern as apertures 146 of cover 140. Clips 132 include ground clips 158 and clips 160 which engage blade electrodes or prongs of a common plug. Clips 158 and 160 include inwardly projecting connectors 162 which pass through apertures 156 and apertures 146 and into cavities 126 to engage a respective conductive bus bar 123 or 125. Connectors 162 on ground clips 158 are coupled to ground bus bar, while connectors 162 of clips 160 engage selected bus bars 123 or 125. It is understood that the configuration of clips 132 may be changed so that the clamps engage different bus bars 123 or 125. Clips 160 also include outwardly opening connectors 164 for receiving prongs of plug connectors therein. Clips 160 provide an electrical connection between a standard plug and the conductive bus bars 123 and 125.

Cover plate 154 is formed to include two sets of standard apertures 170 for receiving standard three-prong plugs. Fastener 131 extends through an aperture 171 formed in cover plate 154, aperture 157 of outlet 152, aperture 150 in cover 140, and aperture 130 of support 100 to secure support 100 to a selected wall panel 12, 14 or 16 or to any exposed surface.

A jumper 24 for coupling adjacent supports 100 together is illustrated in FIG. 9. Jumper 24 includes a body portion 172 and a plurality of inwardly-extending clips 174. Clips 175 are electrically coupled together. Clips 176 are electrically coupled, clips 177 are electrically coupled, and clips 178 are electrically coupled. Clips 174 are inserted into cavities 179 formed in first end 102 of a first support 100 and into cavities 180 formed in a second end 104 of a second support 100 located adjacent to the first support. Clips 174 are coupled to bus bars 123 and 124 within cavities 179 and 180 formed in the end portions 102 and 104 of supports 100 to electrically couple adjacent supports 100 together.

Figure 10:
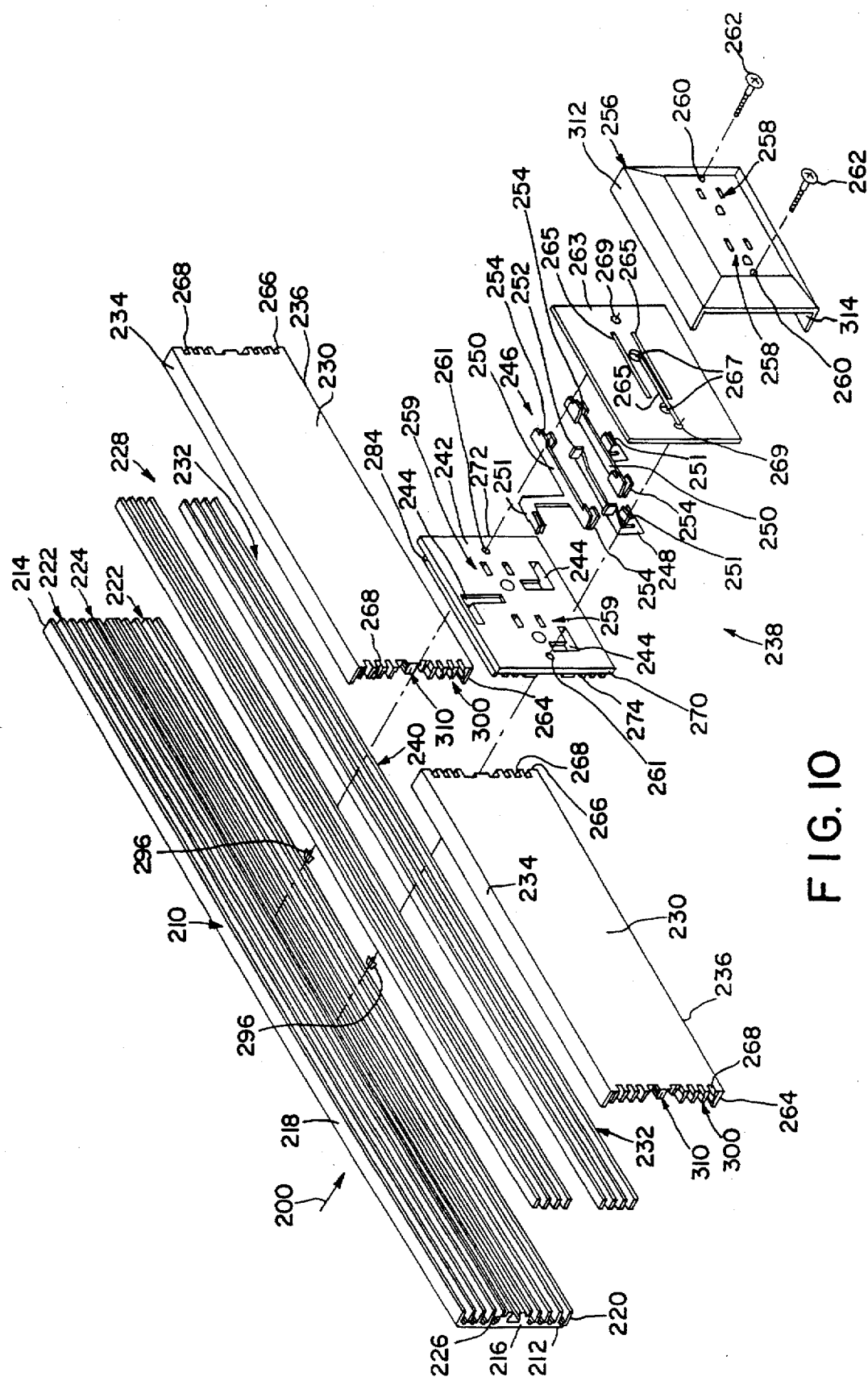
FIG. 10 is an exploded perspective view of an alternative embodiment of a continuous wiring assembly of the present invention including a support, a plurality of conductive bus bars, a pair of covers, and an outlet including a plurality of clips for coupling the outlet to selected ones of the conductive bus bars.

FIG. 10 is an alternative embodiment of a continuous wiring assembly 200 of the present invention that may be mounted at the belt or floor level of wall panels 12, 14, or 16 of wall panel system 10. Continuous wiring assembly 200 includes an electrically insulative support 210 having respective first and second ends 212 and 214, a base 216, and a pair of generally parallel sidewalls 218 and 220 on either side of base 216. Support 210 is configured to include a plurality of generally parallel first dividers 222 that extend from base 216 to define a plurality of spaces 226 that are configured to receive a plurality of conductive bus bars 228 as more fully discussed below.

Wiring assembly 200 further includes a pair of electrically insulative covers 230 that are coupled to support 210 so that first portions 232 of bus bars 228 are positioned to lie between covers 230 and support 210. Covers 230 include side members 234 and 236 that are positioned to lie adjacent respective sidewalls 218 and 220 when covers 230 are coupled to support 210.

Wiring assembly 200 further includes an outlet 238 that is coupled to selected ones of bus bars 228 so that second portions 240 of conductive bus bars 228 lie between support 210 and outlet 238.

Outlet 238 includes a body 242 configured to include a plurality of apertures 244 that receive a plurality of conductive clips 246. Conductive clips 246 include a ground clip 248, as well as power and neutral clips 250. Clips 248 and 250 include connectors 251 that couple clips 248 and 250 to selected ones of conductive bus bars 228. Ground clips 248 include a spring contact 252 and clips 250 include connectors 254 both of which electrically connect to a standard three-prong plug as more fully discussed below.

Outlet 238 further includes a cover 256 configured to include standard three-prong plug apertures 258 in which a standard three-prong plug is disposed to electrically connect to spring contact 252 and connectors 254 of clips 246. Cover 256 is further configured to include apertures 260 that receive fasteners 262 to both assemble body 242, clips 246 and cover 256 together as well as to couple outlet 238 to support 210 as more fully discussed below. Body 242 is also configured to include standard three-prong apertures 259 that receive a standard three-prong plug as well as apertures 261 that receive fasteners 262.

A plate 263 is positioned to lie between conductive clips 246 and cover 256. Plate 263 helps keep clips 246 within apertures 244 as well as against body 242 so that engagement with bus bars 228 is maintained. As can be seen in FIG. 10, plate 263 includes slot apertures 265 that receive blade prongs of a standard three-prong plug and oval apertures 267 that receive a ground prong of the standard three-prong plug. Plate 263 also includes apertures 269 that receive fasteners 262, described above.

As can be seen in FIG. 10, first and second ends 264 and 266 of covers 230 are configured to include a plurality of mortises 268. First and second ends 270 and 272 of body 242 are configured to include a plurality of tenons 274 that fit within mortises 268 of covers 230 to secure outlet 238 to covers 230.

As can be seen in FIG. 11a, base 216 of support 210 is configured to include a plurality of slots 276 adjacent spaces 226 in which the plurality of conductive bus bars 228 are positioned to lie. Body 242 of outlet 238 is configured to include a plurality of dividers 278 that define a plurality of first spaces 280 into which conductive bus bars 228 are positioned to lie when body 242 is coupled to support 210. Second spaces 282 are defined between dividers 278 and side members 284 and 286 of body 242. Sidewalls 218 and 220 of base 216 are positioned to lie within spaces 282 as shown in FIG. 11c. Third spaces 288 are defined between adjacent dividers 278 and receive first dividers 222 of base 216 when body 242 is coupled to support 210 as shown in FIG. 11c. Body 242 is also configured to include a fastener stud 290 that receives fasteners 262 to couple body 242 to support 210. Body 242 is further configured to include a pair of generally parallel strips 289 that are positioned to lie within spaces 291 of second dividers 224 when body 242 is coupled to support 210.

As can be seen in FIG. 11a, a ledge 292 is formed on each of second dividers 224 so that a space 294 is defined between second dividers 224 that transitions from a first size adjacent ledges 292 that is smaller than a second size adjacent base 216 of support 210. Butterfly nuts 296 (only one of which is shown in FIGS. 11a and 11b) threadably engage fasteners 262 (only one of which is shown in FIGS. 11a and 11b) and are positioned to lie within space 294 adjacent ledges 292. Fasteners 262 and butterfly nuts 296 secure outlet 238 together and attach outlet 238 to support 210.

Support 210 is configured to include standoffs 298 that extend in a direction generally opposite that of respective first and second dividers 222 and 224. An adhesive (not shown) is applied to standoffs 298 to couple support 210 to the exposed surface of a wall panel such as wall panels 12, 16, and 18.

As can be seen in FIG. 10, covers 230 are configured to include structure similar to that of body 242. That is, covers 230 are configured to include dividers 300 and a fastener stud 310. Dividers 300 help retain conductive bus bars 228 within slots 276 of support 216 as discussed above in connection with dividers 278 of body 242.

Referring again to FIG. 11a, cover 256 of outlet 238 is formed to include side members 312 and 314. Side members 312 and 314 are positioned to lie adjacent side members 284 and 286 of body 242 when cover 256 is coupled thereto. Cover 256 is also configured to include gussets 316 that lie adjacent plate 263 when cover 256 is coupled to body 242. Gussets 316 provide strength reinforcement to cover 256 when a standard three-prong plug 320 (shown in FIGS. 11b and 11c) is inserted into apertures 258. As can be seen in FIG. 11a, a space 322 is defined between gussets 316 of cover 256. Plug 320 is inserted into apertures 258 within space 322 as shown in FIG. 11c.

Figure 12:
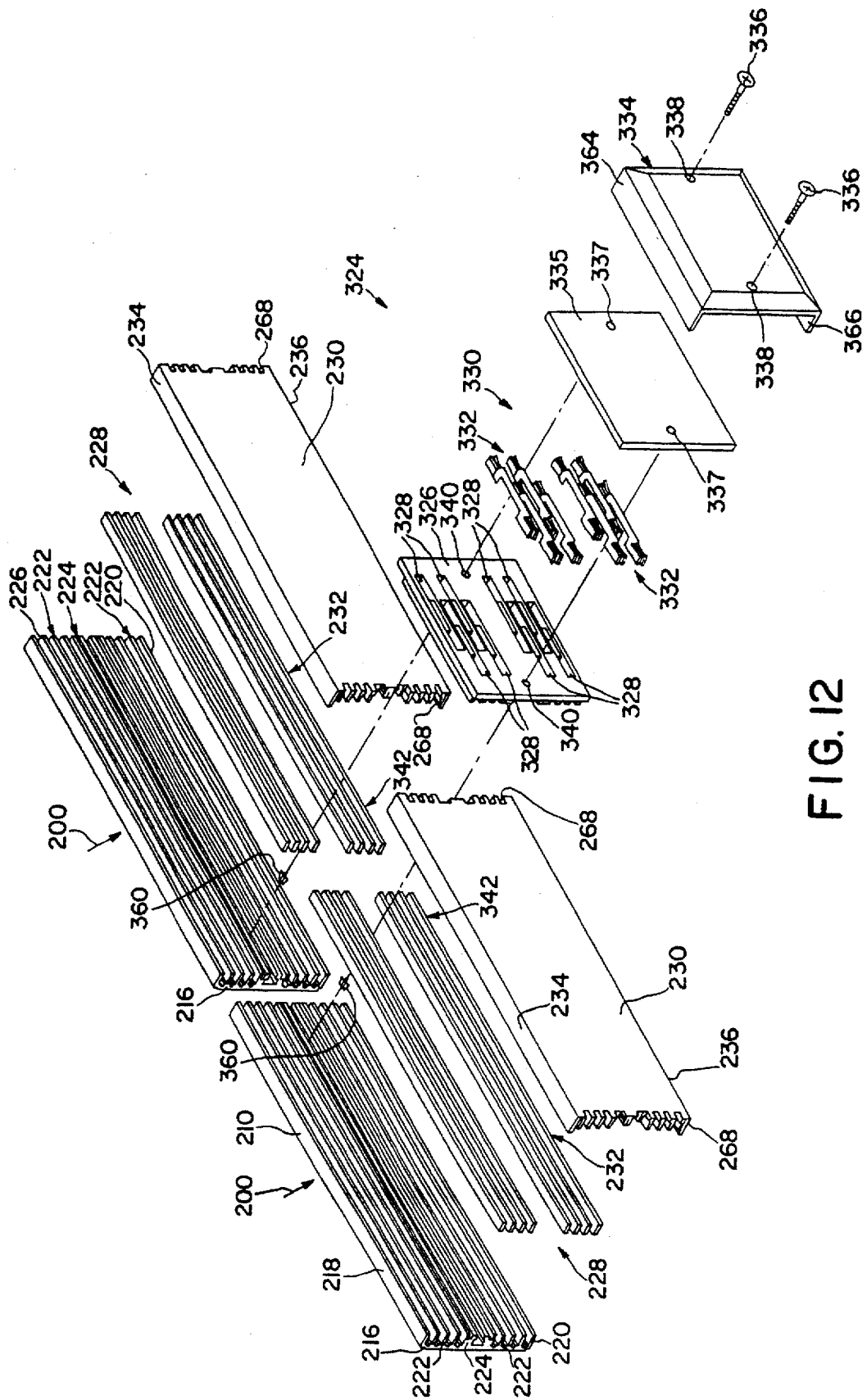
FIG. 12 is an exploded perspective view of two of the alternative embodiments of the continuous wiring assembly of the present invention interconnected by an alternative embodiment of the jumper of the present invention.

A jumper 324 used to interconnect adjacent wiring assemblies 200 is shown in FIG. 12. Jumper 324 includes a body 326 configured to include a plurality of apertures 328 that receive a plurality of conductive clips 330. Bus bar conductive clips 330 are configured to include connectors 332 that couple selected ones of bus bars 228 of adjacent wiring assemblies 200 together. Jumper 324 couples to adjacent supports 210 so that third portions 342 of conductive bus bars 328 are positioned to lie between adjacent supports 210 and body 326 of jumper 324. Jumper 324 also includes a cover 334 that couples to body 326 via a pair of fasteners 336 that pass through apertures 338 of cover 334 and apertures 340 of body 326. A plate 335 is positioned to lie between conductive clips 330 and cover 334. Plate 335 helps keep clips 330 within apertures 328 as well as against body 326 so that engagement with bus bars 228 is maintained. Plate 335 also includes apertures 337 through which fasteners 336 pass. Fasteners 336 secure body 326, conductive clips 330, plate 335, and cover 334 together and couple jumper 324 to supports 210.

As can be seen in FIGS. 13a-13c, both body 326 and cover 334 of jumper 324 include the same structure as body 242 and cover 256 discussed above. Body 326 includes dividers 344, that define spaces 346 into which conductive bus bars 228 are positioned to lie when body 326 is coupled to support 210. First and second side members 348 and 350 of body 326 and adjacent dividers 344 define second spaces 352 into which sidewalls 218 and 220 are positioned to lie. Third spaces 354 are defined between adjacent dividers 344. First dividers 222 of support 210 are positioned to lie within third spaces 354 when body 326 is attached to support 210. Body 326 further includes strips 356 that extend into spaces 291 of second dividers 224 when body 326 is coupled to support 210. Finally, body 326 is configured to include a fastener stud 358 that receives fasteners 336 (only one of which is shown in FIG. 13a) when used in combination with butterfly nuts 360 (only one of which is shown in FIG. 13a) to couple jumper 324 to support 210 as discussed above in connection with the coupling of outlet 238 to support 210.

Cover 334 of jumper 324 includes gussets 362 for strength reinforcement of cover 334 as discussed above in connection with gussets 316. Cover 334 also includes side members 364 and 366 that are positioned to lie adjacent first and second side members 348 and 350 of body 326 when cover 334 is attached thereto.

The jumper of the present invention can be configured to electrically couple adjacent wiring assemblies mounted on the exposed surfaces of wall panels that are angled relative to one another, such as wall panels 14 and 16 shown in FIG. 1. FIG. 14a illustrates a jumper 370 for interconnecting adjacent wiring assemblies 200 mounted on the exterior exposed surfaces of wall panels that are angled approximately 90° relative to one another. Jumper 370 includes first and second body portions 372 and 374 that are positioned to lie adjacent one another so that the first ends of body portions 372 and 374 abut one another generally along a line 376. Apertures 378 and 380 receive fasteners 382 and 384 that couple jumper 370 to adjacent supports 210 of adjacent wiring assemblies 200 as described above.

An alternative embodiment of the jumper of the present invention for electrically coupling adjacent wiring assemblies 200 located on the interior of exposed surfaces of wall panels angled relative to one another at an angle of approximately 90°, such as wall panels 14 and 16 of FIG. 1, is shown in FIG. 14b. First and second body portions 386 and 388 of jumper 384 include first ends that are positioned to abut one another generally along line 390, as discussed above in connection with jumper 370 shown in FIG. 14a. First and second body portions are each configured to include apertures 392 and 394 that receive fasteners 396 to couple jumper 384 to adjacent supports 210 of adjacent wiring assemblies 200 as discussed above in connection with jumpers 324 and 370. Although not shown, it should be noted that other angles for the jumper of the present invention are possible. For example, first and second body portions of an alternative embodiment of the jumper of the present invention could be angled relative to one another at an angle of approximately 45°. This would allow wiring assemblies 200 located on either interior or exterior exposed surfaces of wall panels angled at generally 45° relative to one another to be interconnected.

From the preceding description of the preferred embodiments, it is evident that the objects of the invention are obtained. Although the invention has been described and illustrated in detail, it is to be clearly understood that the same is intended by way of illustrated and example only and is not to be taken by way of limitation. The spirit and scope of the invention are to be limited only by the terms of the appended claims.

What is claimed is:

1. A wiring assembly for mounting on an exposed surface of a wall or wall panel to supply electrical power to the wall or wall panel, the assembly comprising:

a plurality of conductive bus bars;

an insulating support having a base;

said base having a plurality of generally parallel first dividers that define a plurality of spaces in the base of said support which each receive one of the conductive bus bars;

means for coupling the support to the exposed surface;

a first cover coupled to the support so that first portions of the conductive bus bars lie between the support and the first cover, the first cover having a first end; and an outlet coupled to selected ones of said bus bars so that second portions of the conductive bus bars lie between the support and the outlet and a first end of the outlet lies adjacent the first end of the first cover.

2. The wiring assembly of claim 1, further comprising a second cover coupled to the support so that third portions of the conductive bus bars lie between the support and the second cover, the outlet being positioned to lie between the first and second covers so that a second end of the outlet lies adjacent an end of the second cover.

3. The wiring assembly of claim 2, wherein the bus bars each have a first length, the first and second covers have respective predetermined second and third lengths less than the first length, and the outlet has a predetermined fourth length less than the first length so that the outlet is positioned to lie at one of alternate points along the bus bars.

4. The wiring assembly of claim 1, wherein the first end of the first cover is configured to include a plurality of mortises and the first end of the outlet is configured to include a plurality of tenons that fit within the mortises of the first cover to couple the outlet to the first cover.

5. The wiring assembly of claim 1, wherein the first dividers extend from the base and the first cover is configured to include a plurality of generally parallel cover dividers that extend into the plurality of spaces in the support and engage the plurality of conductive bus bars to facilitate positioning of the bus bars within the support.

6. The wiring assembly of claim 5, wherein the cover dividers of the cover define a plurality of spaces into which the first dividers extend.

7. The wiring assembly of claim 1, wherein the support is configured to include a pair of generally parallel adjacent second dividers that extend from the base to define a retaining space therebetween and that are each configured to include a ledge that faces toward the ledge of the other second divider so that the size of the retaining space transitions from a first size to a larger second size.

8. The wiring assembly of claim 7, wherein the first cover is configured to include a stud that extends into the retaining space and lies adjacent the ledges of the second dividers.

9. The wiring assembly of claim 1, wherein the outlet includes a body that is configured to receive a plurality of conductive clips of the outlet that couple to selected ones of the bus bars at one of alternate points along the conductive bus bars.

10. The wiring assembly of claim 9, wherein the body of the outlet is configured to include a plurality of generally parallel dividers that extend into the plurality of spaces in the support and engage the plurality of conductive bus bars.

11. The wiring assembly of claim 9, wherein the support is configured to include a pair of generally parallel adjacent second dividers that extend from the base of the support to define a retaining space therebetween and that are each configured to include a ledge that faces toward the ledge of the other second divider so that the size of the retaining space transitions from a first size to a larger second size, and further wherein the body of the outlet is configured to include a fastener stud that extends into the retaining space and lies adjacent the ledges of the second dividers.

12. The wiring assembly of claim 11, wherein the outlet further includes a cover coupled to the body of the outlet and the support via a fastener that passes through an aperture in the cover and engages the fastener stud and a nut that is positioned to lie within the retaining space of the support to engage the ledges and the fastener so that the conductive clips lie between the body of the outlet and the cover of the outlet.

13. The wiring assembly of claim 1, wherein the coupling means includes a stand-off formed on and extending from the base in a direction generally opposite that of the first dividers of the support.

14. A wiring assembly for mounting on an exposed surface of a wall or wall panel to supply electrical power to the wall or wall panel, the assembly comprising:

a plurality of conductive bus bars;

an insulating support having a base;

said base having a plurality of generally parallel dividers that define a plurality of spaces in the base of said support which each receive one of the conductive bus bars;

means for coupling the support to the exposed surface;

a plurality of covers each having generally opposite ends and each coupled to the support so that portions of the conductive bus bars lie between the support and a respective one of the covers, and the ends of adjacent covers are spaced apart to define outlet spaces therebetween so that portions of the bus bars are exposed in the outlet spaces; and an outlet coupled to selected ones of the bus bars in each of the outlet spaces between adjacent covers so that the exposed portions of the bus bars between the covers on the support lie between the support and the outlet.

15. The wiring assembly of claim 14, wherein there are at least three covers and two outlets positioned between the covers so that the outlets are coupled to the bus bars at different points along the bus bars.

16. The wiring assembly of claim 14, wherein the dividers extend from the base of the support.

17. The wiring assembly of claim 14, wherein lengths of the covers are chosen so that each outlet is coupled to the bus bars at a selected one of a plurality of points along the bus bars.

18. The wiring assembly of claim 14, wherein each end of each cover adjacent an outlet is configured to include a plurality of mortises and opposing ends of each outlet are configured to include a plurality of tenons that fit within the mortises of adjacent covers to couple the outlet to adjacent ones of said plurality of covers.

19. The wiring assembly of claim 14, wherein the outlet includes a body that is configured to receive a plurality of conductive clips of the outlet that couple to selected ones of the bus bars at one of alternate points along the conductive bus bars and a cover coupled to the body and configured to include a plurality of apertures in which prongs of an electrical plug are positioned to connect with the conductive clips.

20. The wiring assembly of claim 19, wherein the body of the outlet is configured to include a plurality of generally parallel outlet dividers that define a plurality of spaces into which the conductive bus bars are positioned to lie.

21. A modular wiring assembly for mounting on an exposed surface of at least one wall or wall panel to supply electrical power to the wall or wall panel, the assembly comprising:

a plurality of conductive bus bars;

a plurality of insulating supports each having a base and a plurality of generally parallel first dividers extending from the base to define a plurality of spaces in the support between the first dividers that are configured to receive one of the conductive bus bars;

means for coupling the supports to the exposed surface to position the supports adjacent one another so that a continuous wiring strip is formed on the exposed surface;

a plurality of covers each having generally opposite ends and each coupled to the supports so that first portions of the conductive bus bars lie between a respective one of the supports and a respective one of the covers and the ends of adjacent covers coupled to the same support are spaced apart;

a plurality of outlets coupled to selected ones of the bus bars so that second portions of the bus bars lie between a respective one of the supports and a respective one of the outlets; and a jumper located between each pair of adjacent supports and electrically coupled to the plurality of conductive bus bars located in each adjacent support in the pair.

22. The modular wiring assembly of claim 21, wherein the jumper includes a body that is configured to receive a plurality of conductive clips of the jumper that couple to the plurality of conductive bus bars in each adjacent support in the pair.

23. The modular wiring assembly of claim 22, wherein the body of the jumper is configured to include a plurality of generally parallel jumper dividers that extend into the plurality of spaces in the support and engage the plurality of conductive bus bars.

24. The modular wiring assembly of claim 22, wherein each support is configured to include a pair of generally parallel adjacent second dividers that extend from the base of each support to define a retaining space therebetween and that are each configured to include a ledge that faces toward the ledge of the other second divider so that the size of the retaining space transitions from a first size to a larger second size, and further wherein the body of the jumper is configured to include a fastener stud that extends into the retaining space and lies adjacent the ledges of the second dividers.

25. The modular wiring assembly of claim 24, wherein the jumper further includes a cover coupled to the body of the jumper and two adjacent supports via a fastener that passes through an aperture in the cover and engages the fastener stud and a nut that is positioned to lie within the retaining space of the support to engage the ledges and the fastener so that the conductive clips lie between the body of the jumper and the cover of the jumper.

26. The modular wiring assembly of claim 21, wherein each jumper includes a body having opposing ends that are configured to include a plurality of tenons and adjacent ends of separate covers on adjacent supports are configured to include a plurality of mortises that receive the tenons to couple each jumper to the adjacent covers.

27. The modular wiring assembly of claim 21, wherein each jumper is configured to have dimensions so that exposed third portions of adjacent conductive bus bars in adjacent supports lie between the adjacent supports and a respective jumper.

28. The modular wiring assembly of claim 21, wherein at least one of the jumpers includes a first body portion having a first end and a second body portion having a first end, and further wherein the first ends are adjacent one another so that the first and second body portions are angled relative to one another.

29. The modular wiring assembly of claim 28, wherein the angle is substantially 90°.

30. The modular wiring assembly of claim 21, wherein there are at least two supports; four covers, two on each support; two outlets, one on each support between the two covers on that support; and one jumper between the two supports.

31. The modular wiring assembly of claim 29, wherein lengths of the covers are chosen so that the outlets are located at selected ones of multiple points along the bus bars.

32. The modular wiring assembly of claim 21, wherein each end of each cover adjacent an outlet is configured to include a plurality of mortises and opposing ends of each outlet are configured to include a plurality of tenons that fit within the mortises of adjacent covers to couple the outlet to adjacent ones of said plurality of covers.

* * * * *